United States Patent

[11] 3,609,440

| [72] | Inventor | Ronald F. Cooper<br>Warrenton, Va. |
|---|---|---|
| [21] | Appl. No. | 827,527 |
| [22] | Filed | May 26, 1969 |
| [45] | Patented | Sept. 28, 1971 |
| [73] | Assignee | Alphanumeric Inc.<br>Lake Sucess, N.Y. |

[54] METHOD FOR ALIGNING A SCANNING LIGHT BEAM ON A PLATEN
1 Claim, 6 Drawing Figs.

[52] U.S. Cl. ................................................. 315/10,
315/18, 315/21 R, 250/217 CR
[51] Int. Cl. ........................................................ H01j 29/70
[50] Field of Search .......................................... 315/18, 19,
21; 250/217 CRT

[56] References Cited
UNITED STATES PATENTS

| 2,903,598 | 9/1959 | Hoover, Jr. | 250/217 CRT |
|---|---|---|---|
| 2,913,622 | 11/1959 | Bartram et al. | 315/21 |
| 3,188,477 | 6/1965 | Ault | 250/217 CRT |
| 3,317,713 | 5/1967 | Wallace | 315/21 X |
| 3,447,026 | 5/1969 | Townsend | 315/21 |

*Primary Examiner*—Rodney D. Bennett, Jr.
*Assistant Examiner*—Brian L. Ribando
*Attorney*—Camil P. Spiecens

ABSTRACT: A horizontal line trace on the face of a first cathode-ray tube display is projected onto a platen. The image of the trace is to sweep over a given line on the platen. The given line is defined by two displaced nonuniformly contoured apertures in the platen. The light passing through the apertures is visually displayed as waveforms on a monitoring cathode-ray tube display and the first cathode-ray tube display is repositioned in accordance with the displayed waveforms until particular waveforms are displayed indicating the image of the trace is sweeping over the given line on the platen.

*INVENTOR.*
Ronald F. Cooper
BY
*ATTORNEY*

METHOD FOR ALIGNING A SCANNING LIGHT BEAM ON A PLATEN

This invention pertains to the projection of light from a source onto a image plane and, more particularly, to a method of aligning light images on a platen.

In graphic arts quality photocomposing systems characters are displayed with high resolution on the face of a cathode-ray tube display. The so displayed characters are optically projected onto a film supported against a platen. In order that there be a minimum distortion, misorientation or skewing of the characters on the film it is necessary that at least one particular trace on the face of the cathode-ray tube fall on a particular line on the film.

It is, accordingly, a general object of the invention to provide a method for aligning the source of a scanning light beam to cause the light beam to sweep over a given line on an image plane.

Briefly, the invention contemplates a method for aligning the source of a scanning light beam to cause the light beam to sweep over a given line on a platen by providing the platen with at least one aperture centered on the given line. The aperture has different contours on either side of the line. The light beam scans the platen in the region of the given line. The intensity of the light passing through the aperture during each scan is converted to an electric signal having waveforms representing the instantaneous intensity of the light passing through the aperture. The waveforms are visually displayed and the light beam is repositioned until a particular waveform is visually displayed.

Other objects, the features and advantages of the invention will be apparent from the following detailed description when read with the accompanying drawing.

Figure 1:
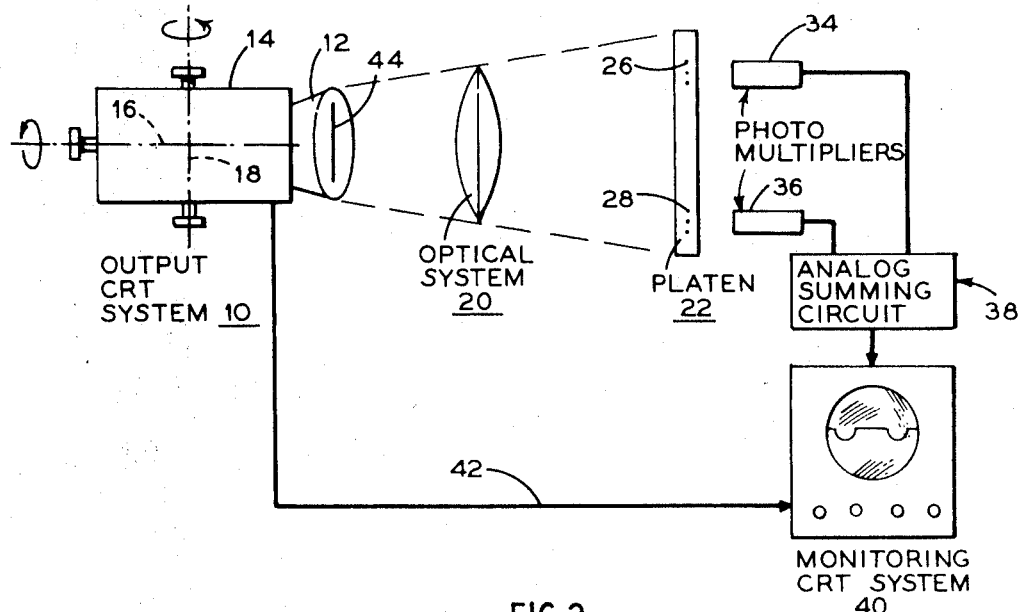
FIG. 1 shows schematically a top view of apparatus for displaying a scanning light beam on an apertured platen and displaying waveforms representing the intensity of the light passing through the apertures.

In FIG. 1 there is shown an output cathode-ray tube system 10 having a cathode-ray tube 12 enclosed in a housing which can include the deflection yokes and all electronics for driving the tube 12. By way of example, the system 10 can be mounted on a gimbal arrangement (not shown) so that it is free to rotate about major axis 16 and minor axis 18. The face of the cathode-ray tube 12 is projected by an optical system 20 onto platen 22. Ordinarily, platen 22 supports a photographic film which records the images on the cathode-ray tube face. In order to insure proper alignment of images from the cathode-ray tube face onto the film during the photographic operation it is necessary to insure that the system is initially aligned and then locked into place.

Figure 2:
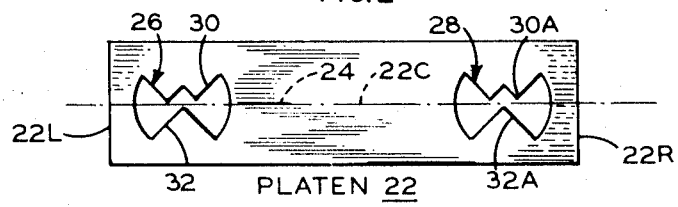
FIG. 2 is a front view of the apertured platen.

It has been found that an ideal way of initially aligning the system is to project a controllable horizontal linear trace on the face of the cathode-ray tube 12 onto a given horizontal line on the platen 22. This given horizontal line, shown as dashed line 24 of FIG. 2, is defined by two apertures 26 and 28. It should be noted that the contour portion of each of the apertures 26 and 28 above line 24 has two downwardly extending teeth 30 while the contour portions of each of the apertures below the line 24 has one upwardly extending tooth 32. Furthermore, the teeth 30 and 32 terminate just before the line 24 to provide an unimpeded gap in the apertures at the line 24.

Immediately behind each of the apertures 26 and 28 is a light transducer such as photomultipliers 34 and 36. The outputs of photomultipliers 34 and 36 are connected via an analog summing circuit 38 to the Y or signal input of monitoring cathode-ray tube system 40. Monitoring cathode-ray tube system 40 also receives at its sync pulse input, via lead 42, sync pulses (sweep triggering pulses) from a sync pulse output of output cathode-ray tube system 10.

In order to align the system, output cathode-ray tube system 10 is controlled to generate a horizontal trace on the tube face, preferably on a horizontal diameter thereof. It is this trace which is to be projected onto line 24 on platen 22. Initial gross alignment can be performed visually by rotating housing 14 about axes 16 and 18 and observing the image on platen 22. However, fine alignment cannot be so accomplished because of the dimensions involved in the alignment. Nevertheless, this gross alignment should cause the image on platen 22 to fall on some part of each aperture 26 and 28.

It should be realized that the line 44 traced on the face of cathode-ray tube 12 is actually a moving spot of light. Therefore, a moving spot of light moves across platen 22. The spot of light can start at the left of platen 22 (FIG. 2), pass through aperture 26, move over the central portion of the platen, pass through aperture 28 and end at the right hand end of platen 22. After a retrace, the scan is repeated. For each scan, output cathode-ray tube system 10 transmits a sync pulse to monitoring cathode-ray tube system 40 to initiate a horizontal sweep therein.

Figure 3:
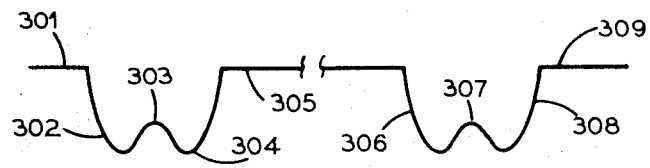
FIGS. 3, 4, 5 and 6 show various waveforms which are displayed by the apparatus of FIG. 1.

If during a scan, a line is swept out across platen 22, which is parallel to line 24, but below said line, monitoring CRT system 40 displays the waveform of FIG. 3. Portion 301 is when the image of the spot of light is between the left edge 22L of platen 22 and the left edge of aperture 26. Portion 302 is when the image of the spot of light is between the left edge of aperture 26 and the left edge of tooth 32. Portion 303 is when the image of the spot of light is between the left and right edges of tooth 32. Portion 304 is when the image of the spot of light is between the right edge of tooth 32 and the right edge of aperture 26. Portion 305 is when the image is on the central portion 22C of platen 22, i.e., between the apertures 26 and 28. A similar analysis can be carried out for portions 306 to 309 when the image of the spot of light moves over aperture 28 to the right hand end 22R of platen 22. Several features of the waveform of FIG. 3 should be noted recalling that the spot of light traced a line parallel to but below line 24. Each pulse of the waveform was similar, i.e., of the same type. And each pulse had a single hump, i.e., portions 303 and 307. The pulses resulted from apertures 26 and 28 and the humps therein from teeth 32 and 32A.

Figure 4:
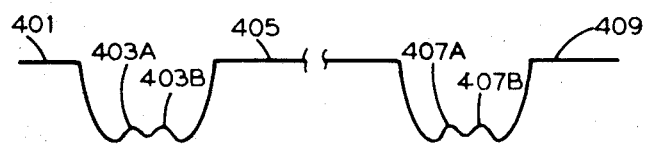

If the image of the spot of light traces out a line of platen 22 which is parallel to, but above line 24, the waveform of FIG. 4 is displayed by monitoring cathode-ray tube system 40. The portions 401, 405 and 409 of the waveform are similar to portions 301, 305 and 309 of the waveform of FIG. 3 since they result from the same phenomena. The portion between portions 401 and 405 results from the image of the spot of light passing over aperture 26. The two humps 403A and 403B result from the spot image being projected sequentially onto each of the teeth 30. The same analysis holds with respect to the portion of the waveform between portions 405 and 409. It should be noted that the two pulses are similar and each has two humps.

Figure 5:
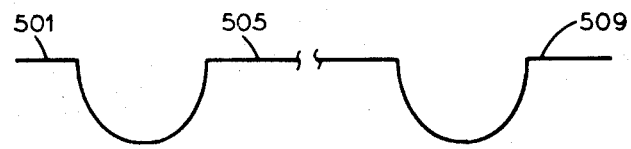

When the line traced out by the image of the spot of light is coincident with line 24, the waveform of FIG. 5 is displayed. Again, portions 501, 505 and 509 have the same significance as portions 301, 305 and 309 of the waveform of FIG. 3. Now, it should be noted that both of the pulses have no humps, the reason being that the image of the spot of light traverses no teeth.

Figure 6:
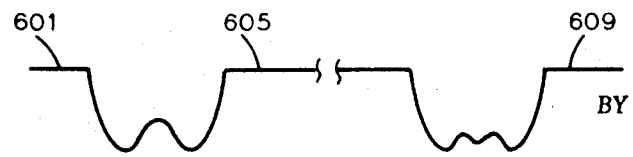

From the above analysis it should be apparent that the waveform of FIG. 6 represents the trace of a line which is skewed with respect to line 24 with the portion of trace in the region of aperture 26 below line 24 as indicated by the single-humped pulse between waveform portions 601 and 605, and the portion of the trace in the region of aperture 28 above line 24 as indicated by the double-humped pulse between waveform portions 605 and 609. If the skew were in the opposite sense then the two pulses would be interchanged. Thus, by observing the displayed waveforms one can obtain a measure of the alignment. Hence, if the waveform of FIG. 5 is displayed then the system is in the desired alignment. If the waveform of FIG. 3 is displayed, it is known that the spot image trace is below reference line 24, and housing 14 is rotated counterclockwise about axis 18 to move the image of the trace upward until the waveform of FIG. 5 is obtained. If the waveform of FIG. 4 is displayed, then housing 14 is rotated clockwise about axis 18 to move the image of the trace downward until the waveform of FIG. 5 is displayed. If the waveform of FIG. 6 is displayed then housing 14 is rotated clockwise about axis 16 until the waveform of FIG. 3 is displayed.

While alignment has been achieved by physically moving the housing 14, the same alignment procedure can be achieved by adjusting the yoke of the cathode-ray tube 12, the deflection currents therein, the optical system 20 and/or the platen 22.

Again, alignment can be achieved in the vertical direction by generating a vertical trace which is to be aligned with a vertical line on the platen defined by two vertically displaced apertures.

While only one embodiment of the invention has been shown and described in detail, there will now be obvious to those skilled in the art many modification and variations satisfying many or all of the objects of the invention but which do not depart from the spirit thereof as defined by the appended claims.

What is claimed is:

1. The method of aligning a light beam to sweep over a given line on a platen comprising the steps of providing the platen with first and second apertures centered on said line and displaced from each other, each of said apertures having different contours on either side of said line, causing said light beam to linearly scan said platen in the region of said given line, converting the intensity of the light passing through said first and second apertures during the scans to electric signals having first and second waveforms, respectively, visually displaying said first and second waveforms and repositioning said source of the scanning light beam to cause the light beam trace to be rotationally moved when said first and second waveforms are of different types until a particular waveform is displayed simultaneously for each of said apertures.